United States Patent [19]

Hilton et al.

[11] 4,212,739
[45] Jul. 15, 1980

[54] DISPOSABLE FILTER CANISTER AND HOUSING

[75] Inventors: Brian T. Hilton, Norwich; Paul Staff, Brandon, both of England

[73] Assignee: UCC International Limited, Thetford, England

[21] Appl. No.: 920,821

[22] Filed: Jun. 30, 1978

[30] Foreign Application Priority Data

Jul. 4, 1977 [GB] United Kingdom .......... 27991/77

[51] Int. Cl.² ............................................ B01D 27/10
[52] U.S. Cl. .................................. 210/130; 210/172; 210/232
[58] Field of Search ............... 210/130, 172, 232, 90, 210/282, DIG. 14

[56] References Cited

U.S. PATENT DOCUMENTS

| | | | |
|---|---|---|---|
| 3,262,564 | 7/1966 | Pall et al. | 210/172 X |
| 3,272,340 | 9/1966 | Hungerford, Jr. | 210/172 X |
| 3,314,542 | 4/1967 | Kudlaty | 210/130 |
| 3,355,021 | 11/1967 | Jones | 210/130 |
| 3,618,776 | 11/1971 | Kudlaty | 210/130 |

*Primary Examiner*—Charles N. Hart
*Assistant Examiner*—Richard W. Burks
*Attorney, Agent, or Firm*—Larson, Taylor & Hinds

[57] ABSTRACT

A filter assembly is provided for fitting to an aperture in the wall of an oil tank of a hydraulic system with a disposable filter canister positioned substantially within the tank. The canister comprises a shell having an end wall and a generally cylindrical side wall, an end plate attached to the shell, a tubular filter element fluid-tightly fitted between the end wall and the end plate to define an outer chamber and an inner chamber between which the only flow path is through the filter element. The end plate has a central aperture communicating with the inner chamber and surrounded by a ring of apertures communicating with the outer chamber. A filter head is fluid-tightly fitted to the outer face of the tank wall in register with the aperture. Locating means in or on the canister cooperate with support means in or on the filter head to support the canister in a predetermined axial position relative to the tank wall with its end wall and at least a major portion of its cylindrical side wall within the tank. A chamber within the filter head communicates with the ring of apertures in the end plate, and a port for connection of an oil inlet or return pipe also communicates with the filter head chamber. An opening through which the cartridge may be inserted or withdrawn is closed by means of a removable cap fluid-tightly fitted to the filter head, and the canister has an aperture in the end wall communicating with the inner chamber.

7 Claims, 5 Drawing Figures

DISPOSABLE FILTER CANISTER AND HOUSING

BACKGROUND OF THE INVENTION

The present invention relates to an oil filter which can be fitted into a reservoir tank and can be connected to the suction line or to the return line of a hydraulic system and to a canister for use in such an oil filter.

An oil filter may be positioned at the point in an oil operated hydraulic system where an oil suction or oil return pipe enters the reservoir tank. The oil may be filtered through a filter canister which is a screw fitting on a filter head or housing mounted on the outer surface of the tank and which projects outwardly therefrom. Examples of such filter canisters primarily for use as oil filters for internal combustion engines are shown in British Pat. Nos. 920,151 (Fram Corporation), 1,017,781 (Puralator Products Inc.) 1,045,288 (Fram Corporation), 1,052,221 (Chevron Research Co.), and 1,429,472 (General Motors Ltd.) Such disposable canisters generally have an end plate formed with oil inlet apertures disposed in a ring and a central threaded oil outlet aperture. A filter head for use with such canisters generally has an annular recess communicating with an oil inlet pipe and an externally threaded centrally positioned oil outlet spigot. In use the threaded central aperture of the canister is screwed onto the oil outlet spigot, the ring of oil inlet apertures registering with the annular recess, and a rubber sealing ring on the end plate being compressed against a region of the filter head surrounding the recess to seal the canister to the filter head. However, the use of an external disposable canister can be undesirable in hydraulic systems on the general grounds of vulnerability and bulk. During the operation of certain types of hydraulic system, distortion of the canister tends to fatigue the end plate to canister joint and may also cause the cover plate and rubber sealing ring to move away from the regions of the filter head against which it is intended to seat which reduces the effectiveness of the oil seal. Furthermore, removal of a spent canister may be made difficult because friction between the rubber sealing ring and the filter head opposes the torque applied to the canister to unscrew it. A strap wrench or other suitable tool may be needed to ease the removal of the canister from the housing.

It has also been proposed to fit within the reservoir tank an internal filter which has a removable filter basket. This arrangement suffers from the disadvantage that the whole filter assembly has to be dismantled each time the filter element needs to be changed, and there is also a risk that contaminated oil may reflux back into the tank during the change of filter element.

SUMMARY OF THE INVENTION

It is an object of the invention to provide a disposable filter canister which can be fitted substantially within the reservoir tank of a hydraulic system, which is easy to replace, and is not likely to spill contaminated oil into the reservoir tank during replacement. Other objects of the invention will become apparent from the detailed description of the invention given below.

In one aspect the invention provides a canister comprising a shell having regions defining a first end wall and regions defining a generally cylindrical side wall, an end or cover plate attached to the shell and defining a second end wall, a tubular filter element fluid-tightly fitted between the end walls to define an outer chamber and an inner chamber between which the only flow path is through the filter element, the end plate having a central aperture communicating with the inner chamber and apertures disposed in a ring about the central aperture and communicating with the outer chamber, and the first end wall having an aperture communicating with the inner chamber.

In another aspect the invention provides a filter assembly for fitting to an aperture in the wall of an oil tank of a hydraulic system, comprising a disposable filter canister as aforesaid;

a filter head dimensioned to receive the canister and fluid-tightly fitted to the outer face of the tank wall in register with the aperture and having an internal chamber in fluid communication with the ring of apertures in the canister, a port communicating with the chamber for connection thereto of an oil suction or return pipe, and a fluid-tight cap which is removable to allow the canister to be withdrawn; and means for supporting the canister in a predetermined postion with the first end wall and at least a major portion of its side wall within the tank.

DESCRIPTION OF THE PREFERRED FEATURES

The canister may comprise a bell-shaped shell which constitutes the first end wall and the side wall, and an end plate which constitutes the second end wall secured to the base of the shell. It is an advantage of the present filter assembly that the joint between the end plate and the shell need not be fluid-tight because when the canister is in use, the joint is within the filter head chamber and leakage of oil to the exterior of the filter head cannot take place. In addition any leakage across this joint does not detract from filtering efficiency as it does not by pass the filter element. In one embodiment the base of the shell has a radially outwardly directed flange to which the cover plate is attached by welding or by other suitable means. The filter housing has at its base on its interior surface an inwardly directed flange bearing a gasket upon which the flange of the canister may be supported under axial thrust in the direction of the interior of the tank, the gasket providing an oil seal between the interior of the tank and the filter head chamber. In another embodiment the base of the filter head has a peripheral groove within which is supported a gasket of resilient material which is directed radially inwardly and presses tightly against the side wall of the canister to form the oil seal between the tank and the filter head chamber. The support member is permanently or releasably fastened to the cover plate and is supported on a support surface (e.g. a groove or lugs) in the filter head chamber to hold the canister in the appropriate axial position.

The canister may be fitted with a pressure operated by-pass valve fitted to the central opening of the end plate for regulating the through-flow of oil, said valve being normally held closed but opening when the pressure difference across the canister exceeds a predetermined differential pressure to permit oil to flow directly between the tank and the filter head chamber via the inner chamber of the canister. When the canister has a radial support flange, the by-pass valve may be supported in a generally tubular valve housing held to the lid of the filter head by means of a spring, the lower end of the valve housing being a push fit in the central or by-pass opening of the cover plate. When the lid is closed the spring is held in compression to urge the valve housing against the cover plate. In addition to maintaining the valve housing in position within the central or by-pass opening, the spring also urges the peripheral flange against the gasket and helps to maintain the oil seal. In the alternative arrangement in which the valve housing is retained in position by the end plate, the central or by-pass opening may be internally threaded and the valve housing may have a male threaded end which may be screwed into the by-pass opening.

DESCRIPTION OF THE ILLUSTRATED EMBODIMENTS

The invention will now be described by way of example with reference to the accompanying drawings in which.

Figure 1:
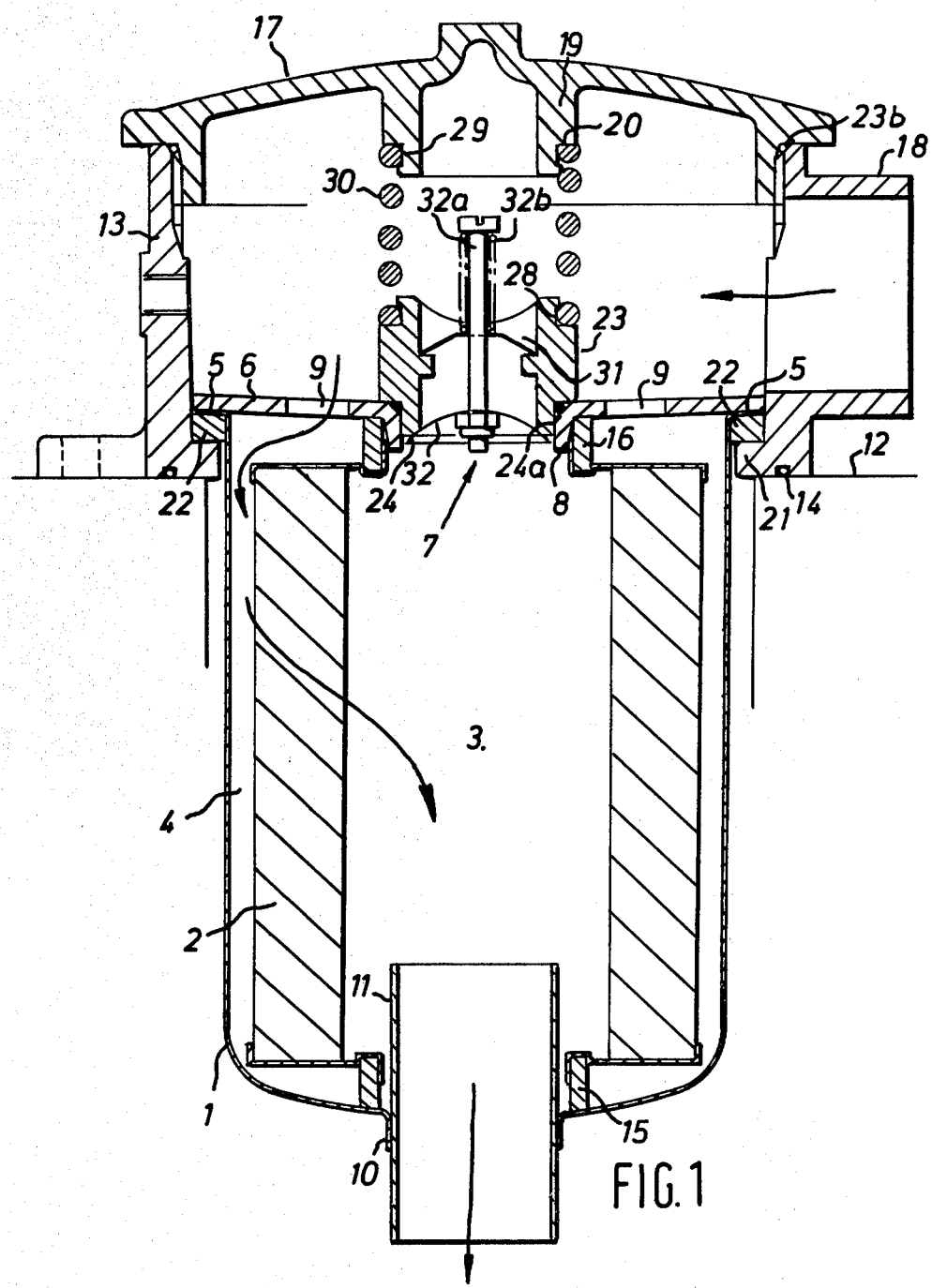
FIG. 1 is a vertical section of a filter canister and a filter head or housing fitted to the return line of a hydraulic system.

In FIG. 1, a generally bell-shaped filter canister has a shell 1 of thin sheet metal which has regions defining a cylindrical side wall and regions defining a first end wall, the open end of the shell having an outwardly directed radial flange 5 to which an end or cover plate 6 is attached by spot welding, projection welding, brazing, spinning or other suitable means to define a second end wall. A tubular filter element 2 consists of a filter medium, e.g. a radially pleated filter paper or a glass-fibre or polypropylene filter element retained between upper and lower end plates. Rubber sealing gaskets extend from respective end plates to the first end wall and to the end plate 6, so that the filter element 2 divides the canister into an outer chamber 4 and an inner chamber 3 between which the filter element 2 provides the sole flow path. The end plate 6 has a central aperture 7 which opens into the inner chamber 3, said aperture having a circumferential flange directed axially into the chamber 3 to define a sleeve 8. A plurality of oil flow apertures 9 in the end plate 6 are disposed in a ring about the central aperture 7 at a radial distance such that they communicate with the outer chamber 4 and not with the inner chamber 3. The end wall regions of the shell 1 are formed with an opening 10 defined by an outwardly directed axial sleeve which is in axial alignment with the aperture 7, and to which is fluid-tightly attached a tube 11 opening into the inner chamber 3.

An appropriately dimensioned aperture is formed in the top wall 12 of a hydraulic fluid tank to receive the canister. The filter head includes a generally circular wall 13 bolted to the top wall 12 of the tank in register with the aperture. A rubber sealing ring 14 is fitted between the base of the wall 13 and the top wall of the tank as an oil seal. The filter head is provided with a detachable cap 17 which when in position seats against a rubber gasket 23b to prevent escape of oil. A spigot 18 is mounted in the wall 13 for attachment of an oil return pipe and communicates via the filter head chamber with the apertures 7 and 9 in the end plate 6. The filter head chamber communicates directly with the oil flow apertures 9 in the end plate 6 and via a a by-pass valve (to be described subsequently) with the by-pass aperture 8. At the base of the wall 13 is formed an inwardly directed circumferential support flange 21 on which is positioned a circular rubber gasket 22. A canister is inserted in inverted orientation into the tank opening with its radial support flange 5 supported on the rubber gasket 22. The outer chamber 4 of the canister is in fluid communication with the filter head chamber via the ring of oil flow apertures 9. An annular valve housing 23 has at its lower end a shoulder 24 whose downwardly directed end portion is a clearance fit in the sleeve 8 of the end plate 6. A fluid-tight annular seal 24a of resilient material is located between valve housing 23 and closure plate 6. At the upper end of valve housing 23 is a spring shoulder 28. The inner face of the cap 17 has on its lower face an axially directed support ring 19 formed at its lower end with a spring shoulder 29. Opposite ends of a coil spring 30 are retained on the shoulders 28 and 29 respectively, e.g. by snap fitting. When the cap is in position in the filter head the spring 30 presses the valve housing 23 against the end plate 6 whereby the flange 5 is pressed downwardly against the rubber gasket 22 to form an oil seal between the tank and the filter head chamber. A spider 31 is supported within the valve housing 23. A poppet valve has an axially directed stem 32a slideably supported in a guide bore in the spider 31 and has a valve disc 32 urged into fluid-tight engagement with a seat portion of the valve housing 23 by means of a second coil spring 32b. The mechanical properties of the second coil spring and the area of the upper surface of the valve disc 32 (which is in contact with the oil within the interior space of the filter head) are determined in accordance with the manufacturer's recommended maximum differential pressure so that the by-pass valve opens when this pressure is reached.

In use, oil flows from the return pipe through the spigot 18 and into the filter head chamber, from which it passes through the oil flow apertures 9 into the outer chamber 4 of the canister. The oil is then filtered through the filter element 2 and passes into the inner chamber 3 and then out through the tube 11 into the tank as indicated by the arrows. In the event of the filter element blocking or the flow therethrough being seriously restricted, the pressure on the valve disc 32 rises above the predetermined differential pressure after which the valve spring 32b is compressed and the poppet valve opens to allow a by-pass flow of oil from the filter head chamber direct into the inner chamber 3 and thence into the tank via the tube 11.

The arrangement described above has the advantage that changing a spent filter canister is a simple operation. The cap 19 is removed and because the ends of the spring 30 are retained on the respective spring shoulders and the lower end of the valve housing is merely a clearance fit in the sleeve 8 (in contrast to the previously known screw fit) the valve housing can be lifted away from the canister as the cap is removed, after which the spent canister can be pulled out from the tank opening through the top of the filter head and a fresh one inserted in its place.

The filter described above has several significant advantages over existing commercially available designs of disposable filter, which include:

(a) the enclosed nature of the filter canister which ensures that contaminant does not return to the oil tank during canister replacement;

(b) easy and inexpensive manufacture, the shell and the end plate being fastened together without an intermediate sealing member;

(c) a loose fit can be provided between the side wall of the canister and the support member so that when the lid of the filter head has been removed the spent canister can readily be extracted;

(d) a downward pressure on the end plate exerted by the oil within the filter head reinforces the thrust exerted thereon by the coil spring 30 and urges the support flange 5 into more close engagement with the oil seal gasket 22 unlike existing installations in which increasing system pressure reduces the effectiveness of the canister seal;

(e) the simplified design of closure plate enables the oil flow apertures 9 in the closure plate to be increased in size, thereby allowing a greater throughput of oil to be obtained for a given pressure difference across the canister; and (f) because the canister is supported on the flange 5 the tendency for the canister to distort in service is reduced and therefore it is anticipated that higher canister operating pressures may be used, or increased fatigue life achieved.

Various modifications may be made to the arrangement described above. For example, the oil filter may be fitted to the suction line instead of to the return line, in which case the direction of oil flow through the canister is reversed and the orientation of the poppet valve within the valve housing 23 is also reversed so that the valve disc 32 seats against a second valve seat on the top of the valve housing and lifts therefrom to allow a bypass flow of oil when the oil pressure in the inner chamber 3 rises. In order that a single design of canister may be used for filtering oil flowing in both a suction and a return direction, it is desirable that the filter element 2 be fitted with an external retaining sleeve between the end plates thereof in addition to the internal sleeve normally fitted. There may also be fitted an oil pressure indicator or gauge so that the operator may be made aware when the pressure drop across the filter due to cumulative blockage thereof has reached an unacceptable degree so that replacement is required.

Figure 2:
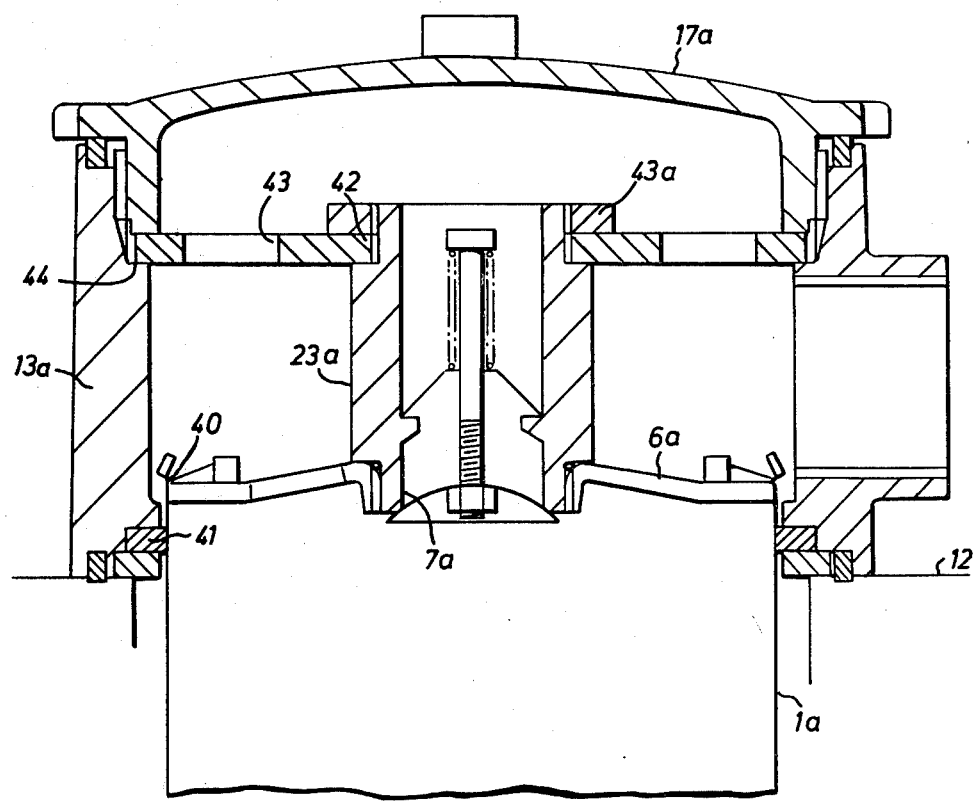
FIG. 2 is a vertical section of the upper end of a filter canister and a filter head or housing for fitting to the return line of a hydraulic system according to a second embodiment of the invention.

The embodiment shown in FIG. 2 is generally similar to that in FIG. 1 except that there is no peripheral sealing flange on the canister but instead there is a fluid-tightly sealed rolled joint 40 between the wall 1a and the end plate 6a. The wall 13a of the filter head has adjacent its base a peripheral groove in which is inserted a rubber gasket 41 which presses against the side wall 1a of the canister to provide an oil seal between the tank and the filter head chamber. The central aperture 7a in the end plate is internally threaded and the lower end of the valve housing 23a has a male thread which engages the aperture 7a. The poppet valve arrangement is as previously described. The upper end of the housing 23a has on its outer surface a screw thread 42 on which is fitted a support plate 43 locked in position by means of nut 43a. The outer ends of plate 43 rest on a shoulder 44 in the internal surface of the filter head side wall 13a. The base of the cap 17a engages the upper surface of the plate 43 to hold it in the correct axial position against the shoulder 44 and because the canister is held rigidly to the support plate 43 by the housing 23a, the canister is retained in the appropriate axial position while the cap 17a is in place. For removal of a spent canister from the tank, the cap 17a is removed, the support plate 43 is lifted out of the filter head together with the housing 23a and the canister 1a, after which the housing 23a is unscrewed from the central aperture 7a.

Figure 3:
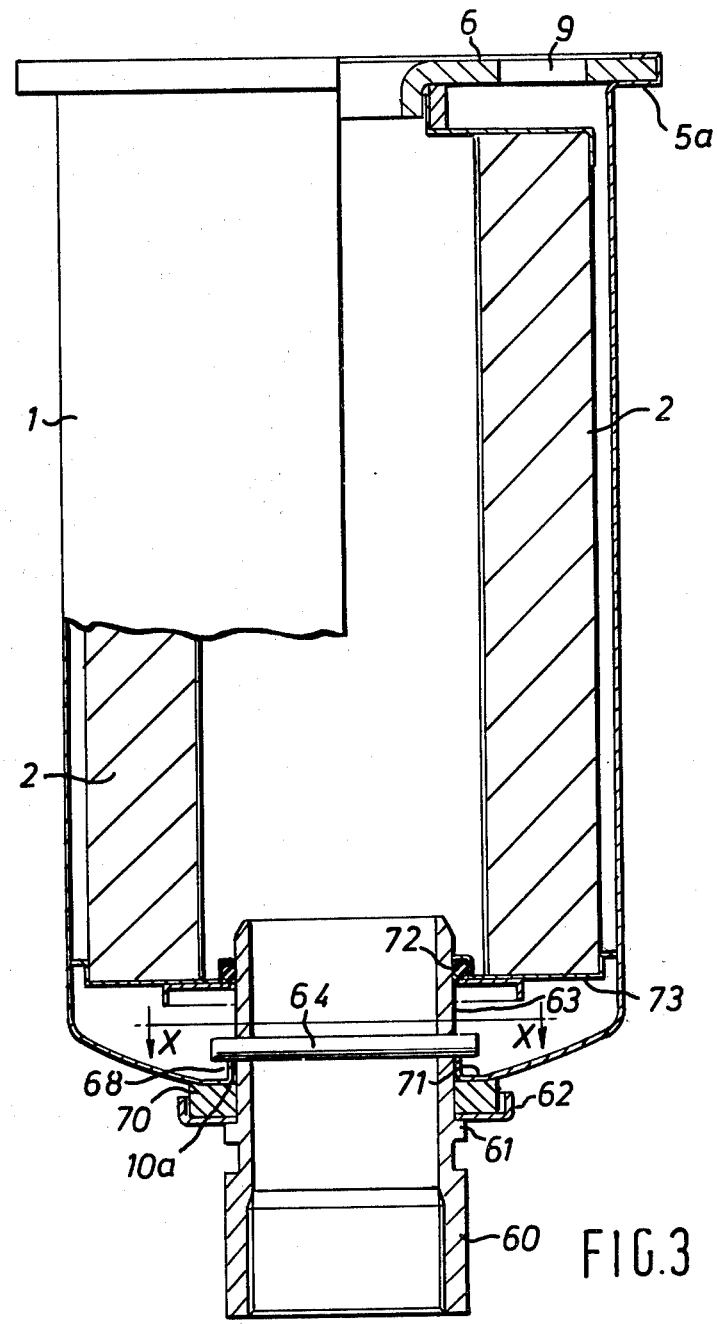
FIG. 3 is a part sectional view of a filter canister according to a third embodiment of the invention.

FIG. 3 shows a filter canister generally similar to that shown in FIG. 1 except that the radial flange 5a of the shell 1 is rolled around the circumferential edge of the end plate 6. The resulting flange has a flat undersurface and no additional sealing of the joint is required for the reasons explained above. The canister also differs from that shown in FIG. 1 in that the return pipe is fitted to the end of the canister by means of a bayonet fitting.

Figure 4:
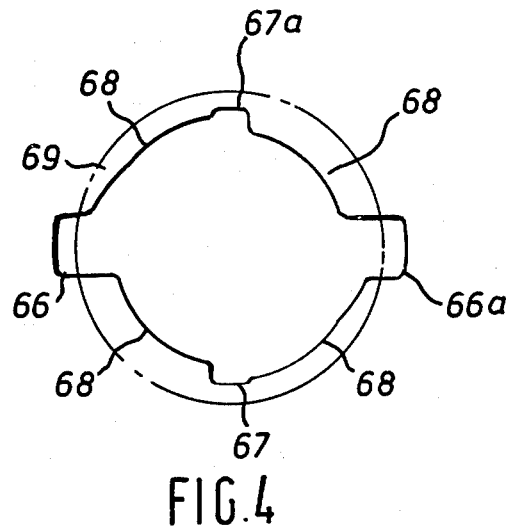
FIG. 4 is a detail plan view of part of the shell blank in partly formed state.

Fitted to the end of the return pipe (not shown) is a spigot 60 having a collar for supporting a seal cup 62, an inner end portion 63 for fitting within the filter canister and a transverse locating pin 64. The apertured end wall region of the shell 1 prior to forming is shown in FIG. 4 and it will be seen that it has a first pair of diametrically opposed radial cut-outs 66 and 66a which are wider than the pin 64 so that the pin can pass through them, a second pair of radial cut-outs 67 and 67a less wide than the pin 64 and defining locating recesses for the pin 64, and inwardly curving edges 68. The chain dotted line 69 marks the diameter of the shell aperture 10a and during forming the shell blank regions within the line 69 are deformed axially inwardly of the shell as is apparent from FIG. 3 so that the edges 68 define bayonet ramps.

Figure 5:
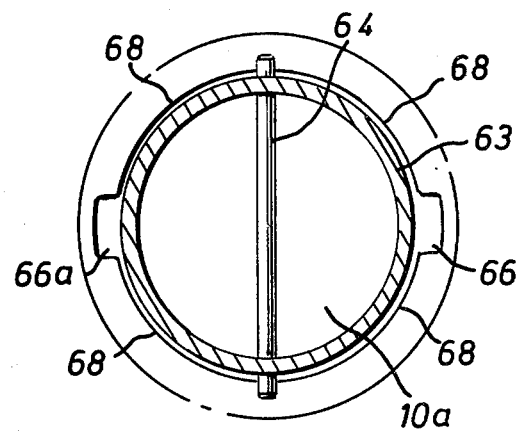
FIG. 5 is an enlarged sectional view of the canister on the lined X—X of FIG. 3.

The spigot 60 is fitted to the canister with a resilient washer 70 between the end of the shell and the cup 62 to prevent leakage of oil. The pin 64 is inserted through the cut-outs 66 and 66a after which the spigot 60 is rotated through 90 degrees to the position shown in FIG. 5 in which the pin 64 travels up the bayonet ramps 68 and rests in the locating recesses 67 and 67a, and the washer 70 is compressed between the cup 62 and a flat at the base of the shell surrounding the shell aperture 10a to provide an oil-tight seal. The inner end of the spigot 60 engages an annular seal 72 at the respective end of the inner chamber 3 and supported in an annular groove within the end plate 73 of the filter element to effect an oil-tight seal between inner chamber 3 and outer chamber 4.

We claim:

1. A filter assembly for fitting to an aperture in the wall of an oil tank of a hydraulic system, comprising in combination:

a separable, disposable filter canister comprising a shell having regions defining a first end wall and regions defining a generally cylindrical side wall, an end plate attached to said shell and defining a second end wall, a tubular filter element fluid-tightly fitted between said first and second end walls to define an outer chamber and an inner chamber between which the only flow path is through said filter element, first regions of said end plate defining a central aperture communicating with said inner chamber and second regions of said end plate defining apertures disposed in a ring about said central aperture and communicating with said outer chamber, and regions of said first end wall defining an aperture communicating with said inner chamber;

a filter head dimensioned to receive said canister and fluid-tightly fitted to the outer face of said tank wall in register with said aperture in said tank wall and having an interior space in fluid communication with said ring of apertures in said canister, a port communicating with said interior space for connection thereto of an oil suction or return pipe, and a fluid-tight cap which is removable to allow said canister to be withdrawn; and means for supporting said canister in a predetermined axial position relative to said tank wall with said first end wall and at least a major portion of said side wall with in said tank, said supporting means comprising an outwardly projecting member associated with said canister and a cooperating portion of the inner wall of said filter head on which said outwardly projecting member seats so that said canister is suspended by said supporting means from said filter head thereby permitting the canister to be removed as a unit.

2. A filter assembly according to claim 1, wherein said second end wall of said canister defines an outwardly projecting flange constituting said outwardly projecting member associated with said canister and portions of said filter head surrounding said aperture in said tank wall define an inwardly directed flange dimensioned to support said canister and constituting the cooperating portion of said filter head, and an annular gasket of resilient material is disposed between said canister flange and said filter head flange to provide an oil seal.

3. A filter assembly according to claim 1, wherein the base of said filter head has a peripheral groove in which there is a gasket of resilient material directed radially inwardly in tight-fitting engagement with the cylindrical side wall of said canister.

4. A filter assembly according to claim 2, wherein a by-pass valve within the interior space of said filter head is fitted within said central aperture in said end plate and is normally closed but opens when the pressure difference across said canister exceeds a predetermined value to allow fluid flow between said interior space of said filter head and inner chamber of said canister.

5. A filter assembly according to claim 4, wherein a spring in compression between said cap and said by-pass valve urges said valve into engagement with said central aperture, the load being transmitted to said peripheral flange of said canister to urge said flange against said gasket.

6. A filter assembly according to claim 3, wherein one end of a fixing member is in threaded engagement with said central aperture of said end plate of said canister, the other end of said fixing member being secured to a removable support member including means constituting said outwardly projecting member associated with said canister and a support in said filter head engages said removable support member to retain said canister in the appropriate axial position, said support constituting said cooperating portion of said filter head.

7. A filter assembly according to claim 6, wherein said fixing member is tubular and supports within itself a by-pass valve which is normally closed but which opens when the pressure difference across said canister exceeds a predetermined value to communicate said interior space of said filter head with said inner chamber of said canister.

* * * * *